United States Patent [19]

Thorley

[11] 4,081,091
[45] Mar. 28, 1978

[54] WHEELCHAIR LIFT

[75] Inventor: Graham Roy Thorley, San Diego, Calif.

[73] Assignee: Transportation Design & Technology, Inc., San Diego, Calif.

[21] Appl. No.: 769,636

[22] Filed: Feb. 17, 1977

Related U.S. Application Data

[63] Continuation of Ser. No. 606,137, Aug. 20, 1975, Pat. No. 4,027,807.

[51] Int. Cl.² ............................................. B62D 25/22
[52] U.S. Cl. ............................. 214/75 R; 105/430; 105/448; 280/166; 296/62
[58] Field of Search ............. 187/1, 9, 10; 214/77 R, 214/75 R, 730, 75 G, 75 T, 75 H; 244/137 R; 296/61, 62; 280/163, 164, 166; 105/443, 444, 445, 447, 448, 449, 430; 52/182, 183, 184

[56] References Cited

U.S. PATENT DOCUMENTS

| | | | |
|---|---|---|---|
| 461,156 | 10/1891 | Barber | 105/447 |
| 3,912,048 | 10/1975 | Manning | 214/75 R |
| 3,957,284 | 5/1976 | Wright | 105/445 |
| 4,020,920 | 5/1977 | Abbott | 105/447 |
| 4,022,337 | 5/1977 | Eichenhofer et al. | 214/75 R |

Primary Examiner—Drayton E. Hoffman
Assistant Examiner—Carl Rowold
Attorney, Agent, or Firm—Henri J. A. Charmasson

[57] ABSTRACT

A lift device particularly suitable for lifting handicapped persons with or without wheelchairs, into a vehicle or building. The lift can be incorporated into the doorway of any given vehicle, or into any step structure within a building. The lift, in its stowed position, forms the normal steps. The platform is made of three hinged parallel sections which can be withdrawn and folded into two steps. A ramp normally hidden under the steps slides forward to allow easy access to the extended platform and a safety flap housed in the ramp flips upward to form an angle stop preventing the wheelchair from rolling backward during platform motion.

6 Claims, 8 Drawing Figures

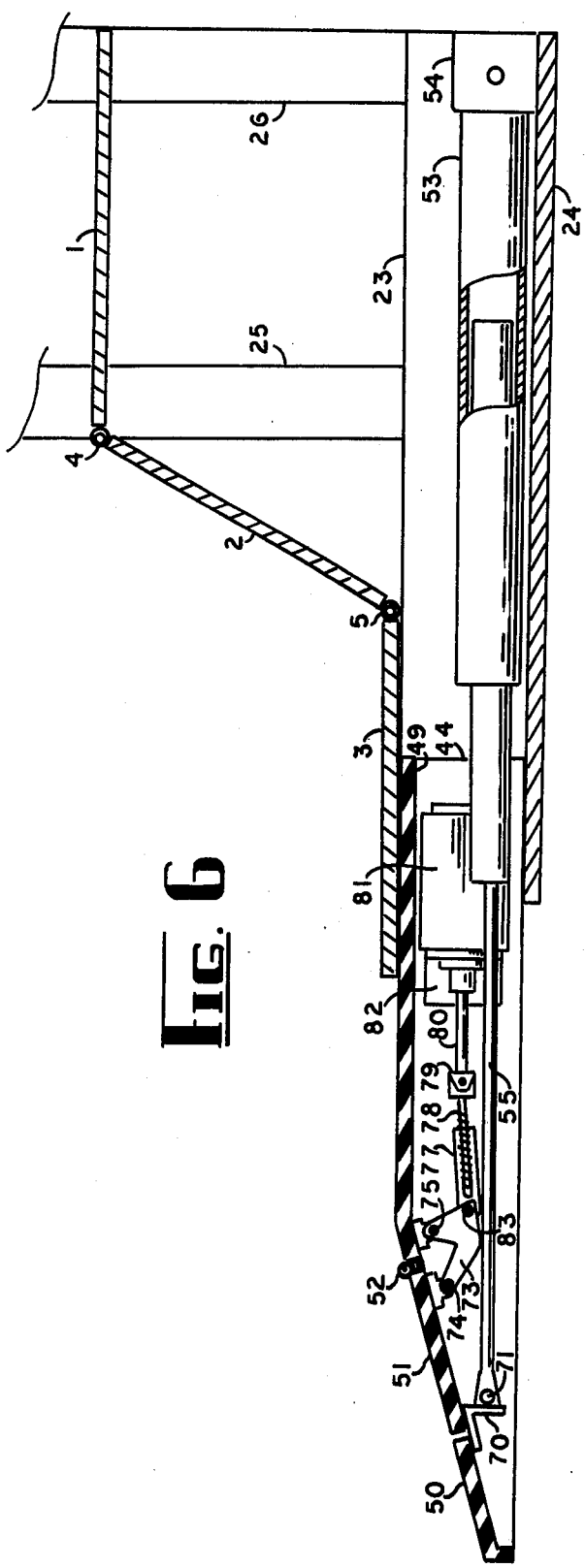
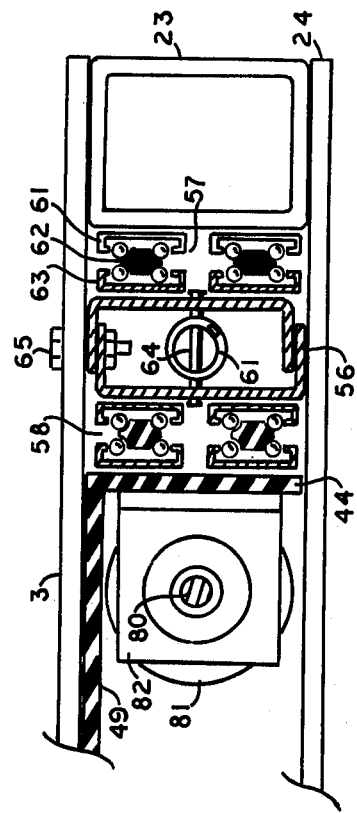
FIG. 6
FIG. 7

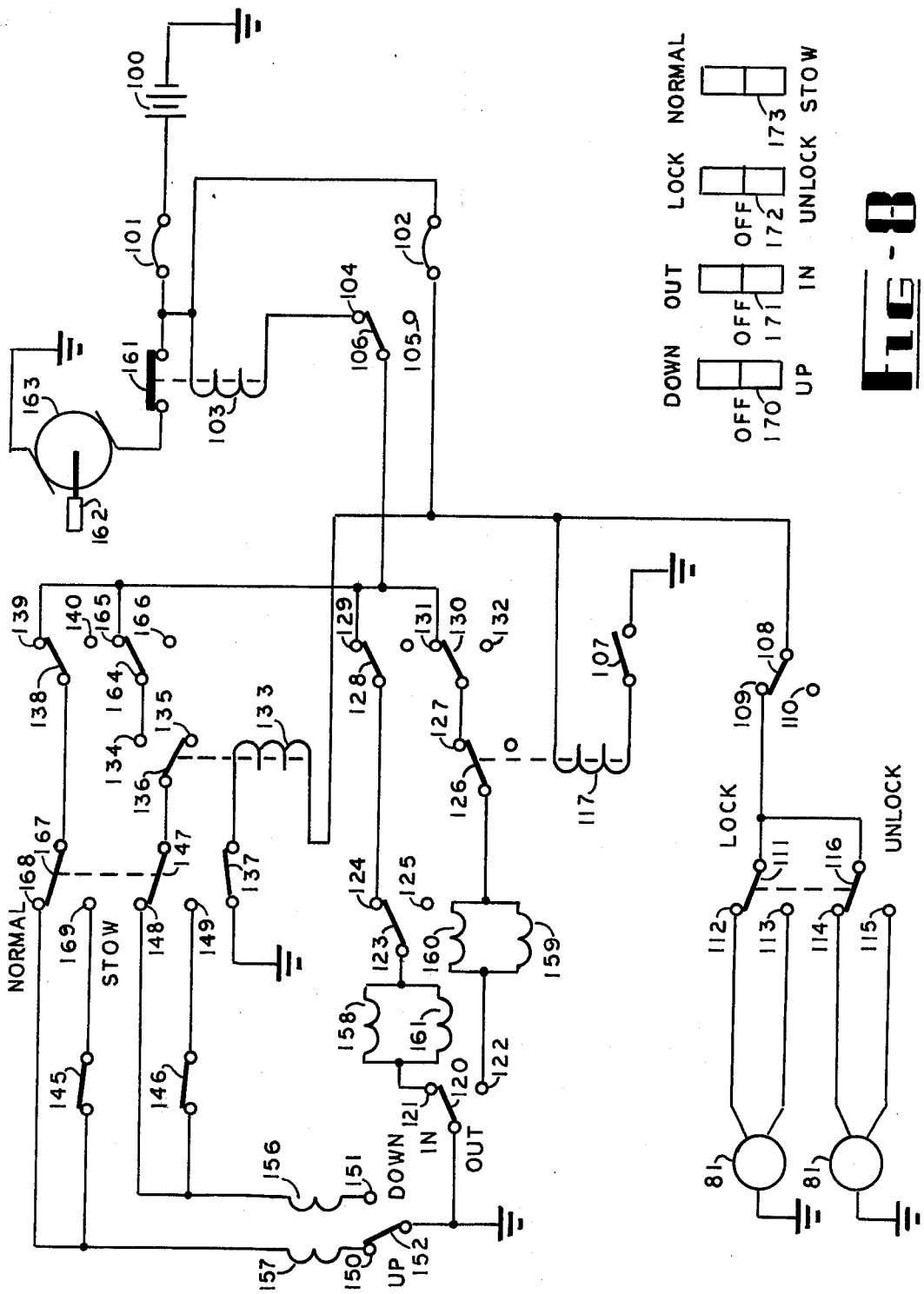

WHEELCHAIR LIFT

PRIOR APPLICATION

This application is a continuation of co-pending application Ser. No. 606,137 filed Aug. 20, 1975, now U.S. Pat. No. 4,027,807.

BACKGROUND

This invention relates to loading mechanisms, and, more particularly, to lift devices suitable for loading handicapped persons with or without wheelchairs into vehicles such as busses or other types of public conveyances. It also relates to lift devices suitable for helping such persons in negotiating steps at the entrance of, or within, a building.

Lift devices which in the past were designed for vehicular use, were relatively bulky and cumbersome, taking up a great deal of space in the interior of such vehicles. It is clearly preferable to have the lift devices completely contained in the vehicles when such vehicles are in motion; however, the large size of the lift mechanisms has often necessitated external location of at least a portion of such equipment. The vehicle cargo capacity has often been greatly reduced by the portion of the lift mechanism located inside the vehicle.

Furthermore, the size and complexity of such lift mechanisms often required that a special opening be cut into the side of the vehicle, in addition to the normal entrances, in order to accomodate the lifts.

Lift mechanisms designed to help handicapped persons in negotiating steps at the entrance of, or within a building which have been provided up to the present time, have been relatively bulky and unsightly. These devices often interfere with the common use of the steps by normal people, and may require the opening of special doors or the installation of special ramps in addition to the normal entrances and stairways. The proposed lift device in its stowed position can act as the normal step structure and be completely hidden within it.

SUMMARY

The lift device can be incorporated into any doorway entrance of vehicles suitable for either public or private conveyance. The lift in its stowed position forms the normal entrance steps and, when required, can either be operated by the driver, without his moving from the driving position, or by the handicapped person himself from the entry location. The various step elements change into a platform which can be lowered, or raised; to any position between vehicle floor height and ground level. The present invention may also be installed within other types of step structures, such as those found in split level homes, at the entrance of a building or as part of a loading dock.

IN THE DRAWINGS

FIG. 6 is a side sectional view taken along the line 6—6 of FIG. 5.

FIG. 7 is an enlarged partial front sectional view taken along the line 7—7 of FIG. 5.

FIG. 8 is a schematic of the electrical system.

DESCRIPTION OF THE PREFERRED EMBODIMENT

As an example of one embodiment of this invention, there is shown a wheelchair lift device mounted within the doorway of a public transportation vehicle.

Figure 1:
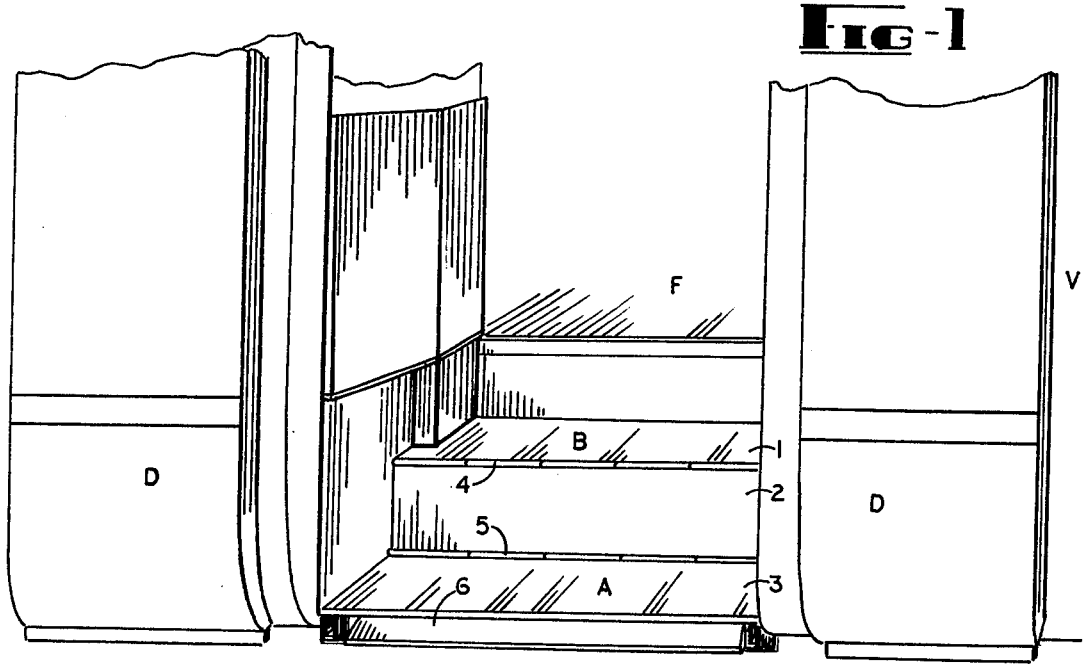
FIG. 1 is a perspective view showing the invention installed in the entrance of a public transportation vehicle in the stowed position.
Figure 2:
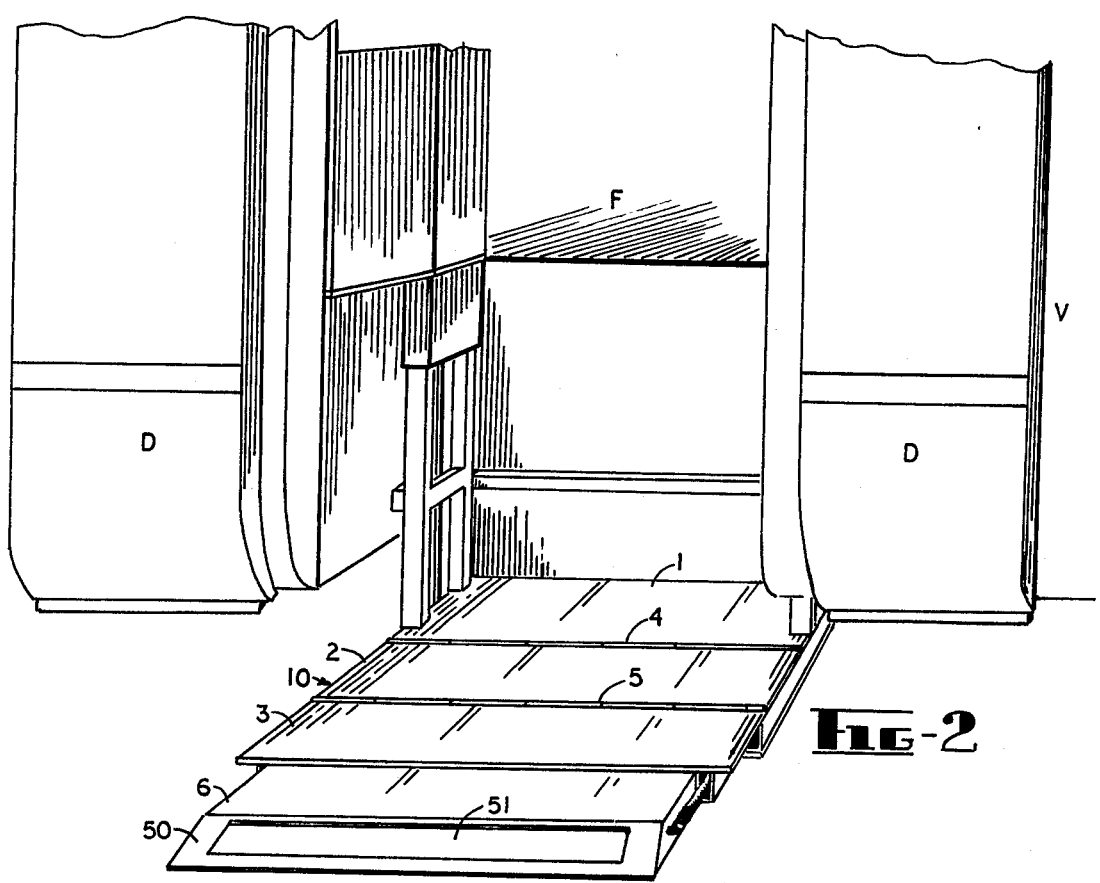
FIG. 2 is a perspective view of the invention shown in FIG. 1 in a deployed position.

In FIG. 1 the lift in its stowed position forms two of the steps (A and B) of the entrance stairway of a vehicle V. In FIG. 2 the lift is deployed in its lower position. It should be noted that the surface of the platform 10 is formed by the level section 1 of step B (which is normally contiguous to the vehicle floor and which has been collapsed to the level of step A), the level section of step A (which has been extended outward) and the joint raiser section 2 between steps A and B (which has been laid down flat). The three sections 1, 2 and 3 are articulated by being hinged together along their edges 4 and 5. In order to return the lift to the stowed position the level section 3 on step A is withdrawn and the raiser section is raised to a vertical position so that the level surfaces 1 and 2 are placed on two different levels forming the entrance steps.

A safety flap 51 flips upward to prevent a load such as a wheelchair from rolling backward during motion of the platform 10.

Figure 3:
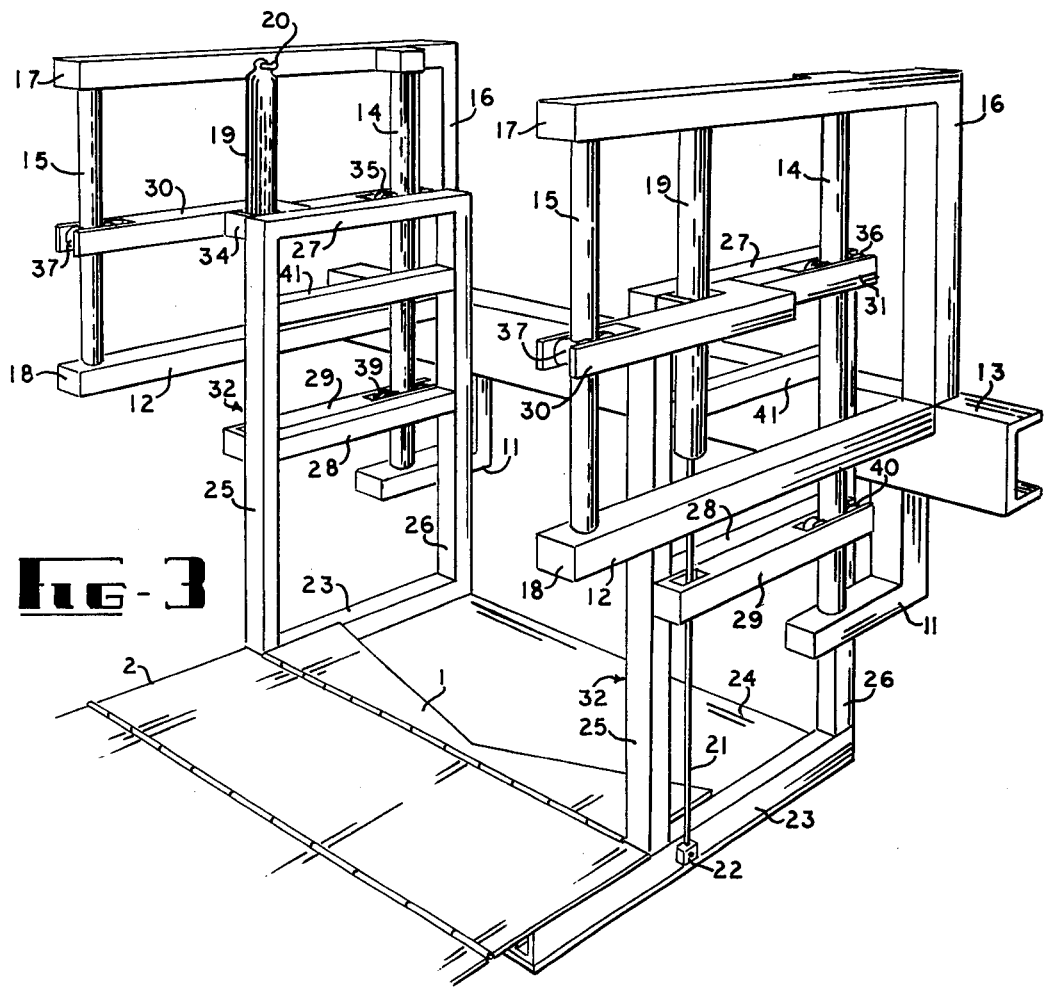
FIG. 3 is a perspective view of the supporting structure and lift mechanism in the deployed position.

Referring now to FIG. 3, the lift device comprises two pairs of horizontal girders 11 and 12 welded to the frame 13 of the vehicle V, and located at opposite sides of the doorway. Girders 11 support two vertical cylindrical rods 14 which are capped at their upper end by the horizontal section of "L" shaped stanchions 16. Girders 12 are preferably anchored to the wall of the vehicle at ends 18. Stanchions 16 are anchored to the wall of the vehicle at their upper ends and to beam 13 of the vehicle at their lower ends. The vertical cylindrical rods 14 and 15 hereinafter referred to as "lifting guides", girders 11 and 12 and stanchions 16 form the supporting framework of the lift device and its stationary components.

Figure 4:
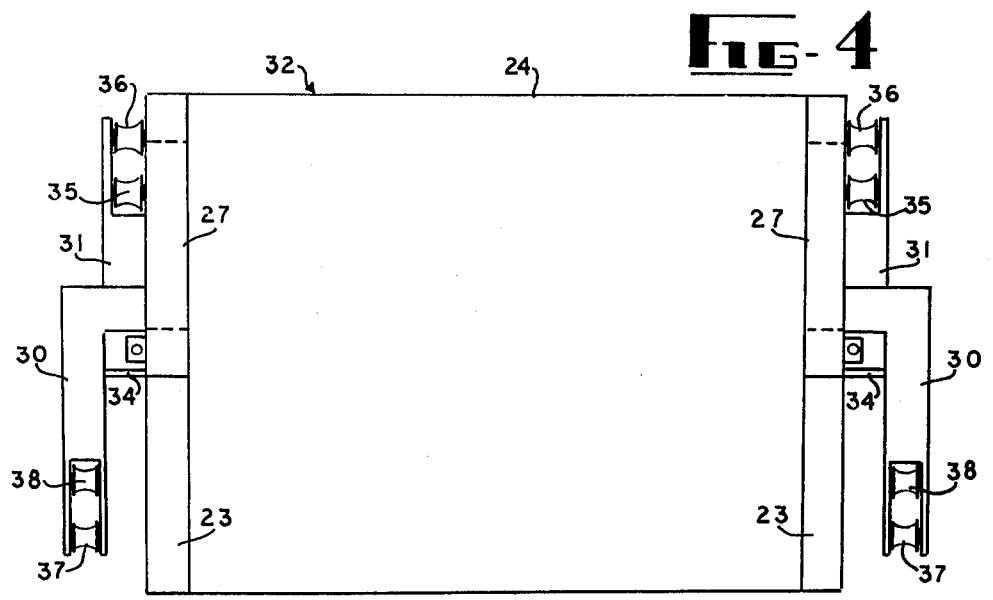
FIG. 4 is an elevational view of the lift carriage frame.

The moving components of the lift device comprising the articulated steps A and B, the retractable access ramp 6 and associated means to form the lift platform, are mounted on a generally "U" shaped carriage 32 designed to ride vertically along and between the two pairs of lifting guides 14 and 15. As more specifically shown in FIG. 4, this carriage comprises a base formed by 2 iron beams 23 linked by a rectangular skid plate 24 flanked by two lateral elements extending upward from the base.

Each lateral element is formed by vertical members 25 and 26 fastened to beam 23, and crossmembers 27, 41 and 28.

Each lateral element is slidably connected to lifting guides 14 at its upper end through bracket 31 at mid-section through bracket 29, and to lifting guide 15 through brace 30.

Pairs of pulley shaped rollers 35 and 36, 39 and 40, 37 and 38 having grooved rims matching the convexity of cylindrical guides 14 and 15 are mounted within bracket 31, 29 and brace 30 respectively capturing said guides and providing a smooth and stable movement of carriage 32 vertically along and between them.

Two hydraulic cylinders 19 are connected at their upper closed ends to the horizontal sections of stanchions 16 by pin 20. Pistons moving within these cylinders under hydraulic fluid pressure are connected at their outer ends through rod 21 to beams 23 by means of pin 22 thus providing means for lifting carriage 31 along and between the lifting guides 14 and 15.

Figure 5:
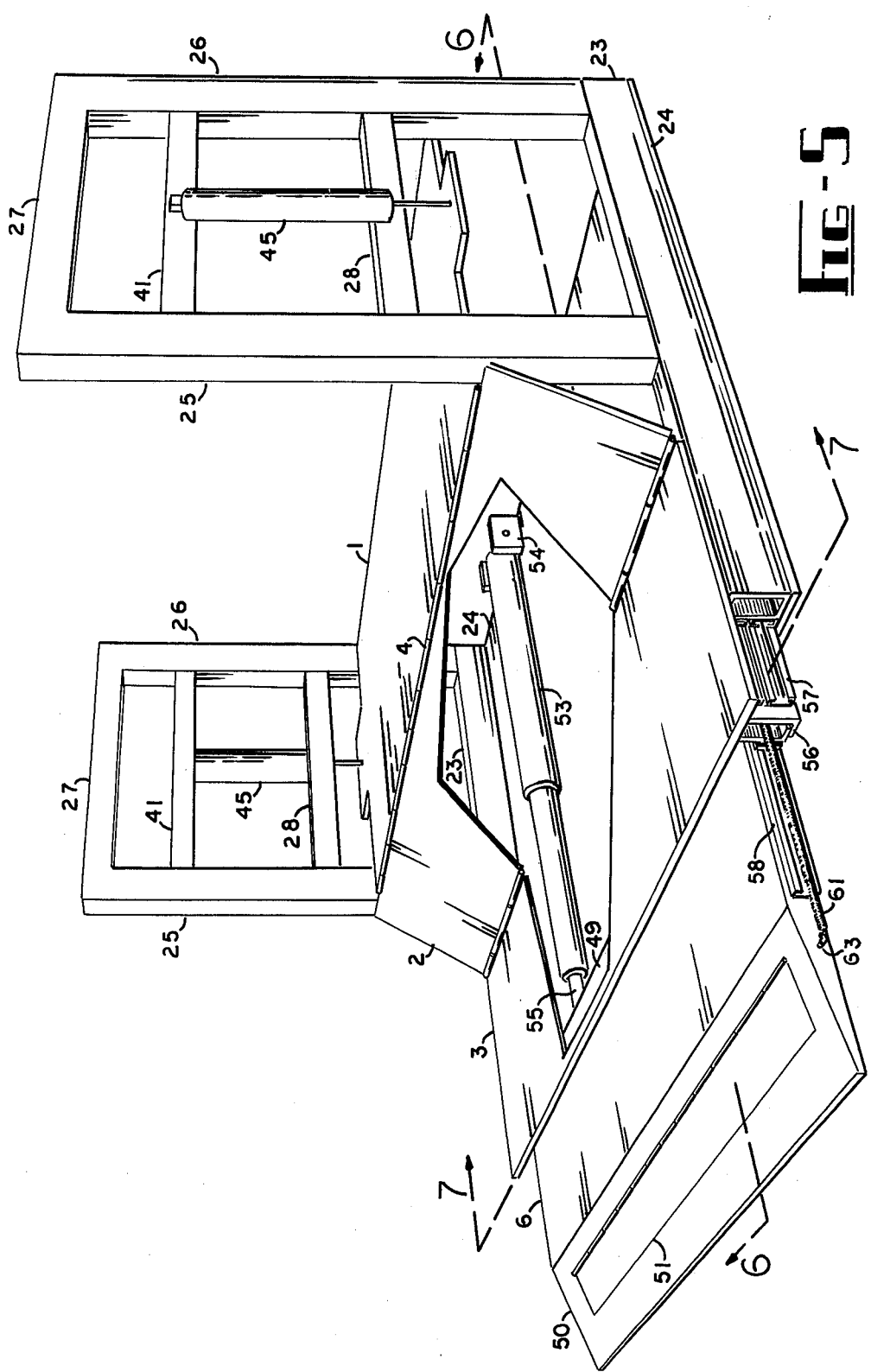
FIG. 5 is a perspective view of a part of the lift carriage, showing the platform in the process of being deployed.

Referring now to FIGS. 5, 6 and 7, the level section 1 of step B is seen riding between vertical members 25 and 26 which act as vertical quides during its collapsing motion.

Two hydraulic cylinders 45 (omitted in FIG. 3) are connected at their upper closed ends to cross-members 41. Pistons moving within these cylinders under hydraulic fluid pressure are connected at their outer ends through rods 46 to opposite ends 48 of level section 1 thus providing means for vertically moving step B along and between members 25 and 26.

Level section 3 of step A is fastened by bolt 65 to two parallel support beams 56 which are slidably connected to beams 23 by means of slide assemblies 57, so that beams 23 constitute two horizontal guides along and between which the level section 3 of step A can be moved. The raiser section 2 joining level sections 1 and 3 of steps A and B, being hinged at 4 and 5 along its two horizontal edges is pulled to lay down flat across beams 23 when section 1 is collapsed and section 3 is extended outward.

A retractable access ramp 6, formed by two parallel members 44 linked by a rectangular plate 49 having a outward sloping area 50, is housed under level section 3 of step A and slidably connected to beams 56 by means of slides assemblies 58.

A pair of coil springs 61 (See FIG. 5) anchored to the inside of beams 56 by pins 64 are tied to opposite sides of ramp 6 by pin 63. A hydraulic cylinder 53 is connected at its closed end to skip plate 24 by means of bracket 54. Telescopic pistons moving within the cylinder 53 under hydraulic fluid pressure are connected to ramp 6 through rod 55.

As more particularly shown in FIG. 6, rod 55 is connected to the sloping area 50 of ramp 6 by means of pin 71 mounted in bracket 70.

Flap 51 lies within a cut-out in the sloping area 50; its upper edge being fastened by a hinge 52 to the sloping area 50. Its lower edge resting upon a section of bracket 70.

Near each of its shorter edges a crescent shaped lever 73, rotating around pin 75 is tied to flap 51 by pin 74.

An electrical motor 81 mounted against beam 23 by bracket 82 have thier shaft 80 connected to threaded rod 78 by means of universal joint 79. The threaded rod 78 engages a threaded tubular member 77 which is itself pivotally connected to lever 73 by pin 83.

The slidable connection between the extensible step 3 and carriage 21, and between the ramp 6 and the extensible step 3 are more particularly shown in FIG. 7.

Slides 57 and 58 are made of standard slide assemblies well known to persons skilled in the mechanical arts and used in a variety of commercial and industrial applications to provide a low friction slidable coupling between mechanical structures. These slides are commercially available under various trade names and generally comprise two outer member channels 61 and 63 capturing a common inner member 62 between rows of ball bearings.

Two parallel slides units are used in slides 57 and 58 in order to provide for a higher load rating of the lift.

Grooved plastic or rubber mats are preferably used to cover the steps and ramp surfaces for safety purposes.

The means for operating the hydraulic cylinders, such as those used in this invention, are well known to people skilled in the mechanical arts, and comprises a source of pressurized fluid, such as a pump, and various conduits for feeding the pressurized fluid to manually or solenoid controlled valves. The valves, in turn, direct the flow of pressurized fluid into the cylinders on either sides of the pistons, so as to control the movement and direction of the pistons within the cylinders. Solenoid controlled valves also having manual lever control are preferably used in the present invention, and in combination with the cylinders and associated means, constitute the electro-hydraulic powered means to operate the lift.

Referring now to FIG. 8, in addition to the other drawings, I shall describe the operation of the lift device.

The lifting motion of cylinders 19 (FIG. 3) is controlled by valve solenoid 157; the lowering action being controlled by valve solenoid 156.

The outward deploying motion of cylinder 53 (FIG. 5) is controlled by valve solenoid 159; the inward retracting actio by valve solenoid 158.

The step lowering motion of cylinder 45 (FIG. 5) is controlled by valve solenoid 160, and the step raising motion by valve solenoid 161.

The electrical power supply comprises the vehicle battery 100 protected by circuit breakers 101 and 102.

Manual switches 170, 171, 172, 173 are accessible from the driver's seat or from the entrance area of the vehicle, and allow the driver or the lift user to control the operation of the lift. Switches 170, 171, and 172 are preferably of a momentary type which return to the off position when released.

A three-position switch 170 controls the position of the common 152 and is used to raise or lower the carriage 32. A three position switch 171 controls the position of the common 120 and is used to deploy or retract the platform 10. A three position switch 172 controls the position of commons 111 and 116, and is used to raise or lower the wheel chair stop flap 51. A two position switch 173 controls commons 147 and 167 and is used to return the lift to its stowed location.

While the switch 173 is in the NORMAL position, holding switch 170 to the DOWN position energizes the valve solenoid 156 through contacts 147-148, 136-134, 164-165, and 106-104. Coil 103 of the pump control solenoid switch 161 is energized and the pump 163 is started, causing the lowering of the carriage 32 by cylinders 19.

Holding switch 170 in the Up position energizes the valve solenoid 157 through contacts 167-168, 138-139, and 106-104. The pump 163 is similarly started and the platform 10 is deployed by extending step section 3 and ramp 50 under action of cylinder 53, while step section 1 is lowered under simultaneous action of cylinders 45.

Holding the switch 171 in the IN position energizes the valve solenoids 158 and 161 through contacts 123-124, 128-129, and 106-105. The pump 163 is similarly started, and the ramp 10 and the step section 3 are retracted under action of the cylinder 53, while the step section 1 is raised under simultaneous action of the cylinders 19.

While the switch 172 is held in the LOCK position, electrical motors 81 are started in a clockwise direction (in reference to FIG. 7) through contacts 111-112, 116-114, and 108-109. The threaded rod 78 (FIG. 6) is extracted from element 77 by an unscrewing motion, pushing lever 73 around pivoting pin 75, thus causing flap 51 to rotate upward around hinge 52.

While the switch 172 is held in the UNLOCK position, the rotation of motors 81 is inverted through contacts 111-113, 116-115, and 108-110.

The resulting forward rotation of the threaded rod 78 retracts element 77 causing the flap 51 to return toward its DOWN position.

The various mechanical motions just described are further controlled through the following switch means. In most public transit vehicles, the door opening mechanism is interlocked with the braking system in order to prevent accidental opening of the vehicle while it is in motion. Therefore, in order to block the operation of the lift device while the doors are closed or the vehicle is moving, the electric power supply is run through a pole of the vehicle door interlock switch whose common 106 contacts with position 104 only when the door is fully open.

A down limit switch actuated when rods 21 (FIG. 3) reach the maximum extension opens contact 164-165 thus stopping pump 163. An up limit switch, actuated when the platform 10 reaches the level of the vehicle floor F opens contact 138-139 in order to stop further lifting action of platform 10. An outward limit switch actuated when the platform 10 is fully deployed, opens contacts 130-131 stopping the deployment operation.

An inward limit switch, actuated when the platform 10 is fully retracted opens contact 128-129 in order to stop further retraction of the platform 10. A mat-type contact switch, located under the skid plate 24, and actuated whenever the platform touches ground or an obstacle, closes contact 137, energizing the coil of obstruction relay 133, causing contact 136-134 to open. This interrupts further downward motion of the platform 10.

A flap-down limit switch actuated when the wheel chair stop flap 51 is down, closes contact 123-124 in order to allow retraction of the ramp 50 only when the flap 51 is lowered.

A ramp-out limit switch actuated when the ramp is fully extended closes contact 108-109 in order to prevent raising the stop flap 51 while the ramp 50 is retracted.

A stowed position switch actuated when the carriage 10 reaches its normal step position opens contacts 145 and 146, stopping further upward or downward motion of the carriage when switch 173 is in the STOW position.

A tape switch located along the outward edge of ramp 6 and actuated whenever the ramp hits an obstacle, closes contact 107, energizing the coil of relay 117, thus opening contact 126-127 and preventing any further extension of the platform 10. The standard sequence of operation is generally as follows. After opening the door D of the vehicle V, hand flipping switch 173 to the NORMAL position, the driver holds switch 170 in the DOWN position until the carriage 32 touches ground. After releasing switch 170, he holds switch 171 in the OUT position until the platform 10 and ramp 6 are fully deployed. After the loading of the wheel chair onto the platform 10 the flap 51 is raised by holding switch 172 in the LOCK position for a short while.

The platform 10 is raised to the level of the vehicle floor F by holding the switch 170 in the UP positon. After entry of the wheel chair into the vehicle, switch 73 is returned to the STOW position. The flap 51 is lowered by holding switch 172 in the UNLOCK position. The carriage 32 is lowered to the stow away level by holding switch 170 to the DOWN position and the platform 10 is retracted into the stowed step position by next holding the switch 171 on the IN position. The sequence of operation may be appropriately reversed to lower a wheel chair from the vehicle floor to the ground. The carriage 32 may also be lowered or raised without unfolding the steps A and B into a platform.

A lever 162 is mounted on pump 163, along with manual control of the valves, to operate the lift device in case of electric power failure. The pump itself is preferably located near the entrance and/or control switches.

While I have described one embodiment of the present invention, many variations may be suggested without departing from the scope of the invention. For instance, an electro-hydraulic power means could be used to control the operation of the wheel chair stop-flap rather than the motor means described here. In some applications where only one or two steps are required, the collapsible intermediary step B could be completely omitted.

It will be apparent to those skilled in the art that other variations may be made in the details of construction and application without departing from the spirit and scope of this invention as defined in the pending claims.

I claim:

1. In the doorway of a vehicle a wheelchair lift which in its stowed position forms the normal entrance steps comprising:
   vertical lifting guides fastened to the vehicle frame on each side of the doorway;
   a carriage having lateral vertical elements slideably connected to the lifting guides and a horizontal base;
   means for vertically moving the carriage along the lifting guides;
   supported by the horizontal base of the carriage, a multisectional platform which comprises:
      a first section which in its uppermost position lies across the doorway contiguously to the vehicle floor between the lateral elements;
      a second section adjacent to the first section and hingedly connected to it;
      a third section adjacent to the second section and hingedly connected to it;
      hinge means for connecting the first section to the second section and the second section to the third section;
      means for withdrawing third section toward the vehicle and for raising the second section vertically, whereby the first and third sections are placed on two different levels separated by the vertical second section.

2. The wheelchair lift claimed in 1 wherein said means for withdrawing and for raising comprise
   hydraulic powered means for moving the third section in relation to the carriage;
   said means for vertically moving the carriage comprise hydraulic powered means for moving the carriage in relation to the vertical lifting guides.

3. The wheelchair lift claimed in 2 wherein the several hydraulic powered means can be manually or electrically actuated.

4. The device claimed in 1 which comprises:
   a retractable access ramp; means for slideably connecting the ramp to the carriage, and means for horizontally extending and retracting the ramp.

5. The device claimed in 4 wherein said ramp comprises:
   a wheel chair stop flap hingedly connected to the top surface of the ramp; and
   means for raising and lowering the stop flap.

6. In the doorway of a vehicle, a wheelchair lift which in its stowed position forms the normal entrance steps comprising:
   a multisectional platform which comprises:
      a first section;
      a second section located between the first section and a third section hingedly connected to said first and third sections, forming the central part of a flat load carrying surface of the platform when in a horizontal position;
   the third section adjacent to the second section;
   means for hingedly connecting the first section to the second section and the second section to the third section;
   means for supporting said platform;
   means for moving said platform between ground level and vehicle floor level whereby in its uppermost position the first section lies across the doorway close to the vehicle floor;
   means for withdrawing the third section toward the vehicle and for moving the second section to a substantially vertical position, whereby the first and third sections are placed on two different levels separated by the substantially vertical second section.

* * * * *

UNITED STATES PATENT OFFICE
CERTIFICATE OF CORRECTION

PATENT NO. : 4,081,091

DATED : March 28, 1978

INVENTOR(S) : Graham Roy Thorley

It is certified that error appears in the above-identified patent and that said Letters Patent are hereby corrected as shown below:

The terminal part of this patent which would extend beyond the expiration date of Patent No. 4,027,807 issued June 7, 1977 has been disclaimed.

Signed and Sealed this

Twentieth Day of March 1984

[SEAL]

Attest:

*Attesting Officer*

GERALD J. MOSSINGHOFF

*Commissioner of Patents and Trademarks*